A. W. CHRISTIANSON.
MACHINE FOR MAKING STAG HANDLES.
APPLICATION FILED SEPT. 13, 1915.
1,185,984.
Patented June 6, 1916.
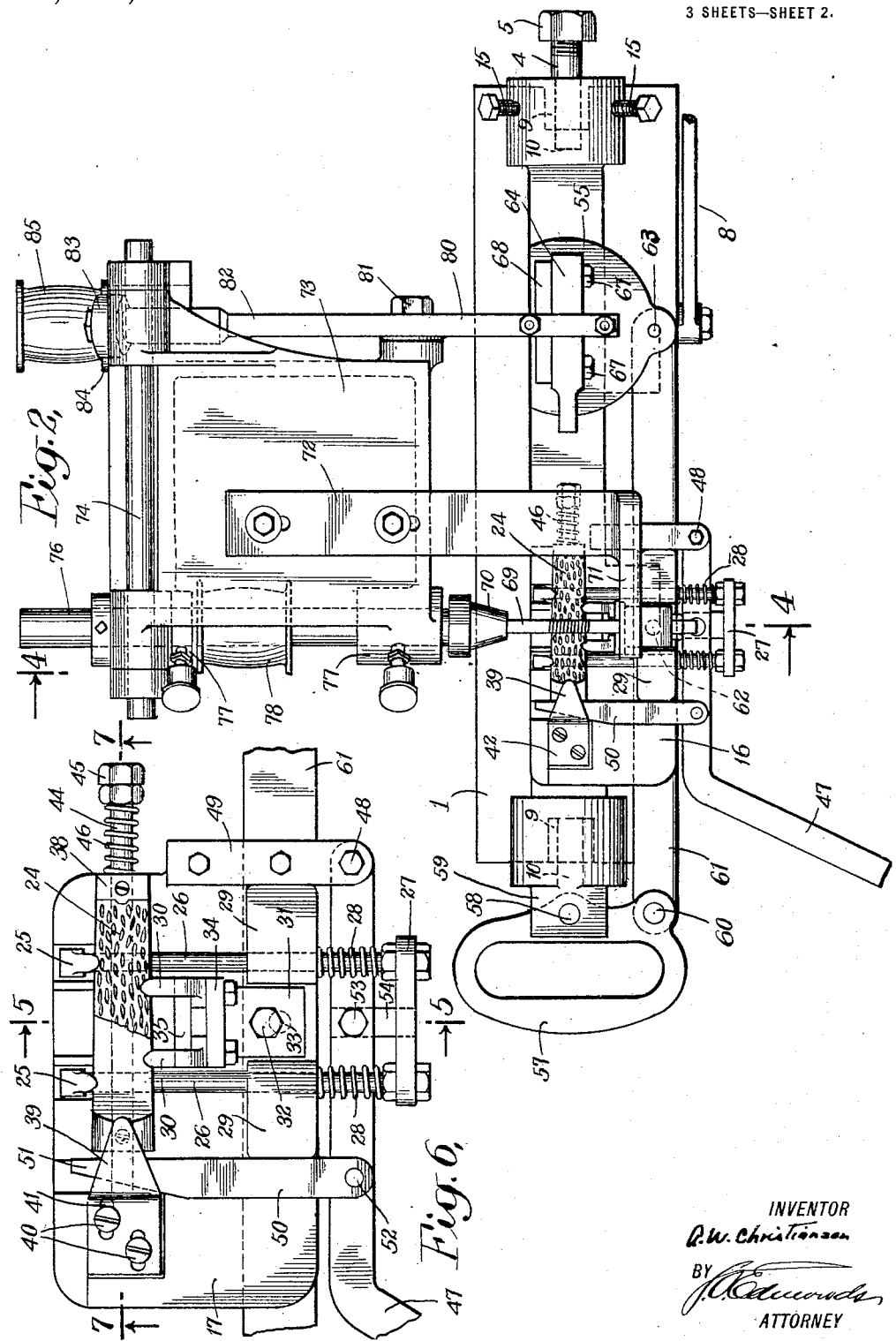
INVENTOR
A. W. Christianson
BY
ATTORNEY

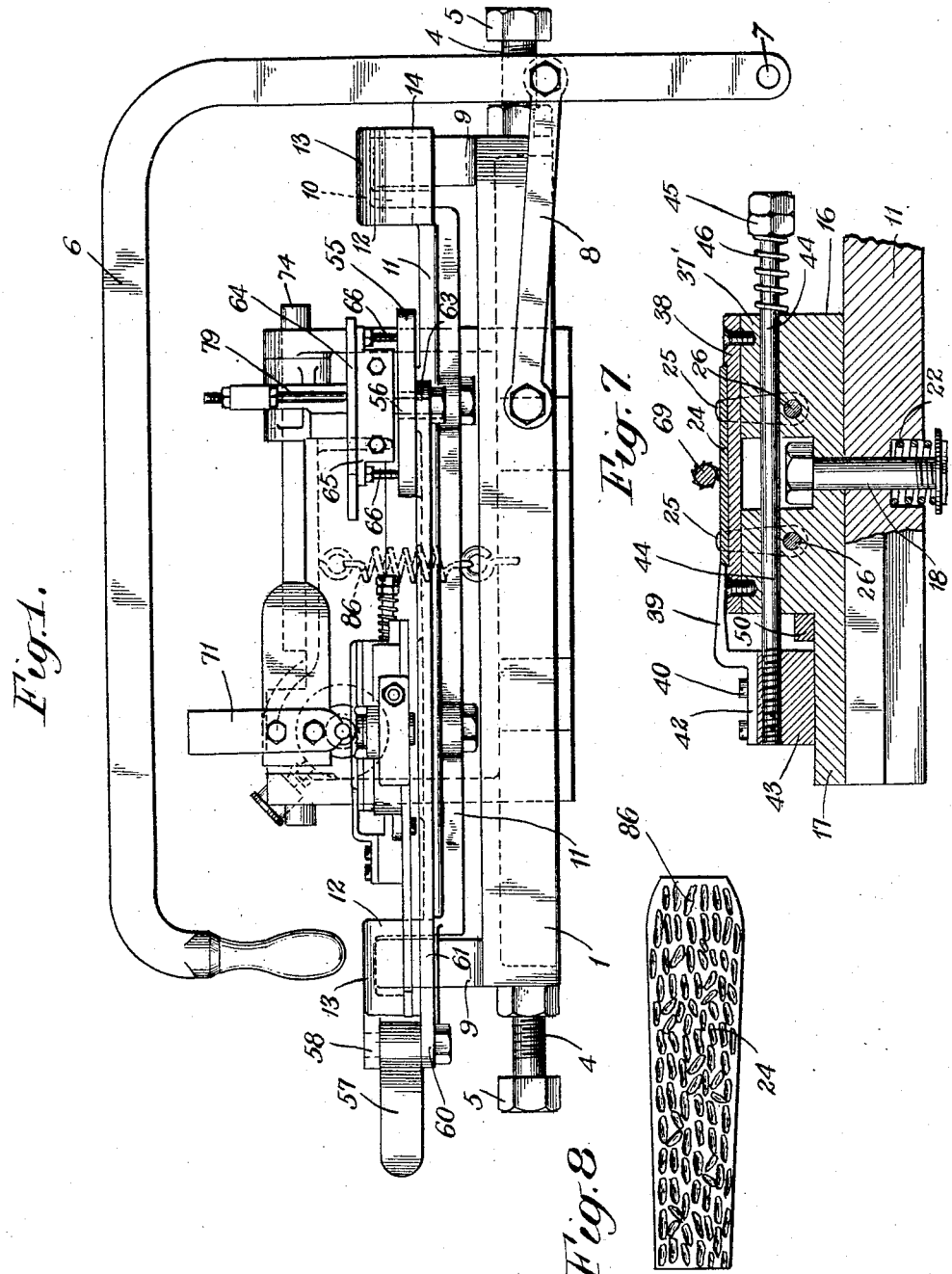

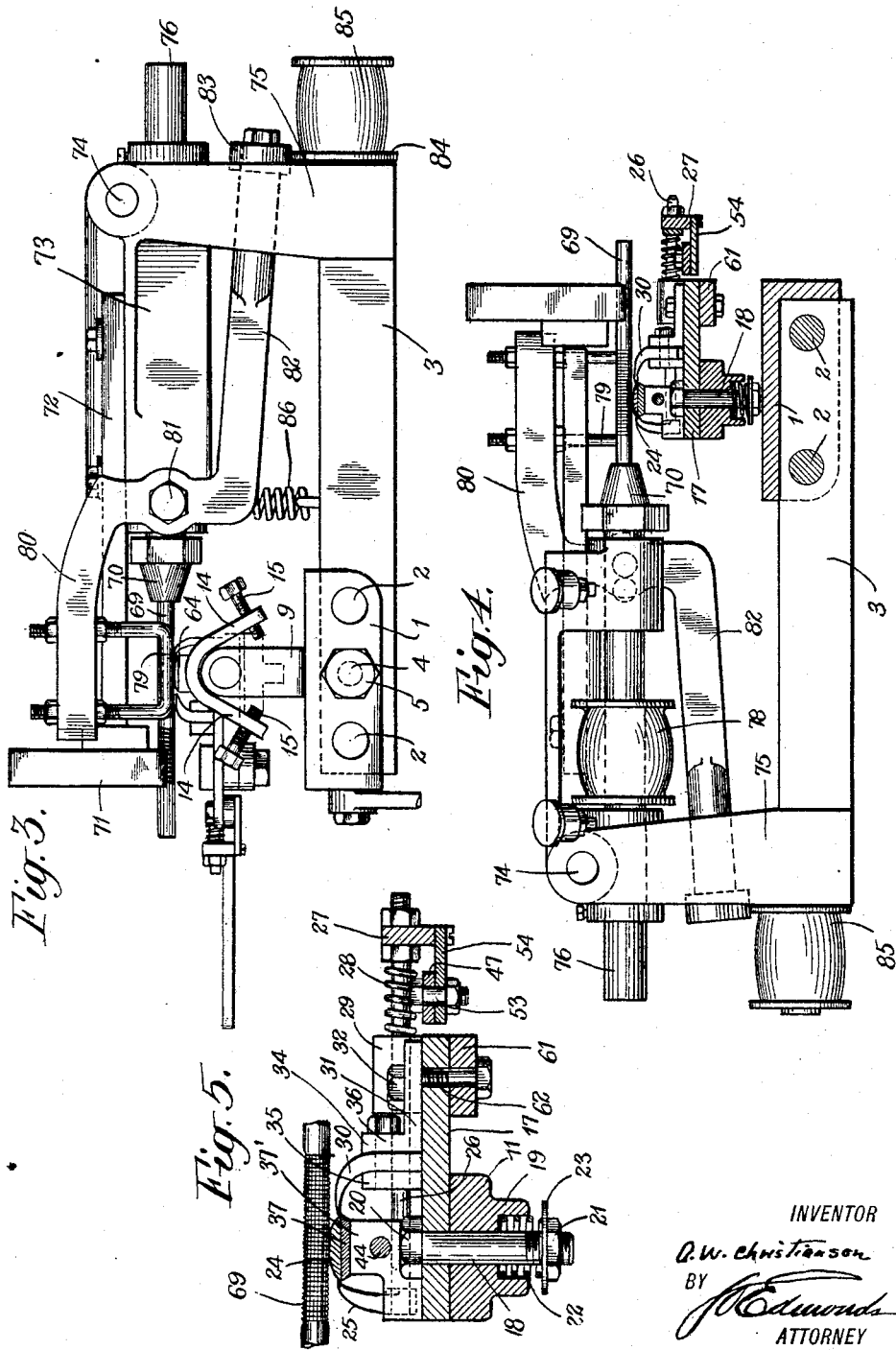

UNITED STATES PATENT OFFICE.

ADOLPH W. CHRISTIANSON, OF WALDEN, NEW YORK.

MACHINE FOR MAKING STAG-HANDLES.

1,185,984.  Specification of Letters Patent.  Patented June 6, 1916.

Application filed September 13, 1915. Serial No. 50,313.

*To all whom it may concern:*

Be it known that I, ADOLPH W. CHRISTIANSON, a citizen of the United States, residing at Walden, in the county of Orange and State of New York, have invented certain new and useful Improvements in Machines for Making Stag-Handles, of which the following is a specification.

My invention relates to a machine for carving imitation stag handles for knives or for making irregularly gouged or indented surfaces on similar articles. Stag handles for knives, or "stag scales" as they are known in the art, are made from bone, fiber or wood, or other suitable material, and commonly have various figures cut on the surface thereof. The operation is usually performed by hand, by passing a stag scale over a rotating cutter and varying the angle of advance of the scale while moving it toward and away from the cutter, to form gouges or indentations thereon in an irregular pattern. My invention provides a machine for performing such operations more efficiently and with much greater economy and speed of production.

In my improved devices a stag blank clamped in a suitable work-holder is reciprocated back and forth beneath a rotating cutter, to which a rapid up and down motion is imparted. During the reciprocation of the blank, its angular position, in a horizontal plane, with respect to its path of reciprocation past the cutter, is or may be continually changed, so as to cause the blank to move under the cutter in varying diagonal directions. The angular position of the blank relative to its horizontal axis, assuming that the path of reciprocation of the blank is horizontal, may also be changed at will during the reciprocation of the blank, so that in the case of a knife handle or other blank curved transversely, the curved edges of the same may be presented to the cutter.

A templet, having the same shape as the blank, is mounted in a suitable holder and reciprocates with the work-holder, and also oscillates about vertical and horizontal axes at the same time and to the same extent as the work-holder. This templet is used for positioning the cutter properly in relation to the work, so that the up and down motion which is imparted to the cutter shall form gouges in the surface of the blank of the same or approximately the same depth irrespective of the contour of the blank and whether the same is being cut upon its curved edge or upon the highest central surface of the same.

The object of my invention is to provide mechanism for carrying out the operations briefly referred to in an effective manner.

Other objects of my invention reside in the details of construction and combinations of parts hereinafter more fully described and pointed out in the appended claims.

In order that a clearer understanding of my invention may be had, attention is hereby directed to the accompanying drawings forming part of this application and illustrating certain embodiments of my invention.

In the drawings Figure 1 represents a side elevation of a machine comprising my invention, Fig. 2 is a plan view of the same, Fig. 3 is an end view, Fig. 4 is a transverse vertical section taken on line 4—4 of Fig. 2, Fig. 5 is a vertical transverse section taken on line 5—5 of Fig. 6, Fig. 6 is a plan view of the work-holder, Fig. 7 is a vertical longitudinal section taken on line 7—7 of Fig. 6, and Fig. 8 is a plan view of a sample stag scale as made by the machine.

Referring to the drawings embodying a preferred form of my mechanism, the slide 1 is adapted to reciprocate horizontally upon rods 2, 2, which are supported in the bed-plate 3. Adjusting screws 4, 4, are mounted in the bed-plate and extend through each end of slide 1, and have nuts 5, 5 thereon to limit the length of travel of the slide in either direction. Reciprocating movement may be given slide 1 in any desired manner. In the drawings, I have illustrated a hand-lever 6, pivoted at 7 to part of the frame, a connecting rod 8 being pivotally secured at its ends to the slide and to the hand-lever, so that the operator may reciprocate slide 1 at any desired speed.

Slide 1 has standards 9, 9, extending upwardly from the same, adjacent its two ends, on the longitudinal center line of the slide. Horizontally-extending pins 10, 10 are mounted in standards 9, and rocking support 11 is pivoted on said pins, so as to be capable of oscillation about an axis parallel to the path of travel of slide 1. Support 11 has yoke portions at each end comprising vertical portions 12, through which pins 10 extend, to support the member, top portions 13 extending above standards 9, 9, and side portions 14, 14 extending downwardly on each side of standards 9 at an angle, as shown in Fig. 3, the yoke thus being in cross-section similar to an inverted V. Screws 15, 15 extend through the side flanges 14 of the yokes to form adjustable stops, since the ends of screws 15 are adapted to bear against the sides of standards 9, to limit the oscillation of rocking support 11 in either direction.

A work-holder and a templet-holder are mounted upon rocking support 11, to swing about vertical pivots. The work-holder illustrated as a whole by the numeral 16 comprises a plate 17, which is pivotally mounted upon a pin 18 which extends through a boss 19 on rocking support 11. Pivot pin 18 may suitably be provided with a head or nut 20 on its upper end above plate 17 of the work-holder and a nut 21 adjustable on its lower end, a spring 22 being coiled about pin 18 in a recess in boss 19, and bearing against the upper surface of a washer 23 mounted upon nut 21, and the upper surface of the recess referred to in boss 19.

The blank 24, from which the stag scale is to be cut is clamped on the work-holder by means of clamping fingers, the preferable form of which will now be described. Rear clamping fingers 25, 25 are mounted on rods 26, 26, which extend transversely through the work-holder and are connected at the front side of the work-holder by cross-head 27. Spiral springs 28, 28, are interposed between cross-head 27 and blocks 29, through which rods 26 extend, these blocks being secured to plate 17. The front clamping fingers 30, 30, are carried by, or are integral with, a plate 31, mounted on plate 17, plate 31 being secured in adjusted position, to take care of blanks of different thicknesses by a bolt and nut 32, the bolt extending through one or another of the openings 33, in plate 31, and through the plate 17. The clamping fingers 30 are preferably made separable from the plate 31, so that different clamping fingers may readily be substituted. In the form shown in Fig. 5, plate 31 is provided with an upwardly extending flange 34, and clamping fingers 30 are secured between flange 34 and a plate 35, by means of bolts 36.

The blank 24 is positioned on bearing surface 37 of the bearing member 37', secured on, or integral with, plate 17, with one end pressed against an abutment 38 formed on member 37². The other end of the blank is engaged by the clamping member 39, which has an offset portion 42, which is secured upon block 43, slidably mounted on plate 17, by means of screws 40, extending through slots 41 in the offset portion 42. A rod 44 extends through block 43, in which it is screw-threaded for adjustment. Rod 44 extends parallel to the blank and under the same, through the raised portion 37' of the work-holder and has nuts 45 on the opposite end thereof with a spiral spring 46 coiled around the rod between nuts 45 and the adjacent edge of the work-holder. Spring 46 accordingly draws gripper 39 against the end of the blank while springs 28 on rods 26 cause gripping fingers 25 to press against the rear edge of the blank. The grippers are opened by means of a hand-lever 47, which is pivoted at 48, to the cross-member 49, secured to plate 17. A member 50, having a wedge-shaped end 51, is pivoted to lever 47, at 52, and cross-head 27, is pivotally connected to lever 47, by means of a bolt 53, extending through lever 47 and a short cross-member 54, secured to cross-head 27. The tapered end 51 of member 50 extends between sliding block 43 and the blank-supporting portion of plate 17, arm 50 being guided and supported by its contact with the end surface of the adjacent block 29, as shown. When it is desired to open the grippers, lever 47 is moved to the left, referring to Fig. 2, whereupon wedge 50 presses block 43 to the left, referring to Figs. 2 and 6, and the connection between lever 47 and cross-head 27 moves the rear grippers 25 rearwardly against the pressure of springs 28.

The templet-holder comprises a plate 55, which is mounted on rocking support 11, to oscillate about a vertical pin 56. Handle 57 is pivoted on a vertical pin 58, to the horizontal flange 59, extending to the left, referring to Fig. 1, from the yoke portion 13 of rocking support 11. The handle has pivotally connected thereto at 60 a link 61, which is pivotally connected to the plate 17 of the work-holder, by the pin 62, and is pivotally connected to the templet-holder 55 by the pin 63. The templet 64 is secured on a support 65, which is held at a desired adjusted height above swivel plate 55, by means of screws 66, support 65 having flanges which rest upon the heads of screws 66. Support 65 may be secured in adjusted position by means of bolts 67, extending horizontally through slots in support 65, and through a vertical extension 68, from member 65, on the rear side of the templet-holder, referring to Fig. 2.

Movement of handle 57 about its pivot 58, rocks the work-holder and templet-holder together about their vertical pivots, the blank 24 and templet 64 being so mounted upon their respective holders as to remain parallel to each other at all times, as they, with their respective holders, are oscillated about the vertical pivots 18 and 56 respectively. The handle 57 also serves to rock support 11 about its horizontal axis, as desired, or to hold the same level or in any desired oscillated position.

The cutter 69, which may be of the milling cutter type, extends transversely above the path of blank 24 and is held between a split chuck 70 at one end and the vertical end support 71 on the other or outer end, support 71 being secured to the horizontal plate 72, which is secured to the upper surface of the rocking table 73. The latter is pivotally mounted at its rear, referring to Figs. 2 and 3, on a pivot rod 74 supported by standards 75, extending upwardly from the bed-plate 3. Chuck 70, in which the cutter 69 is secured, is mounted upon a shaft 76, which is supported in bearings 77, from rocking table 73. Shaft 76 is rotated by means of a belt running over pulley 78 on shaft 76.

The bridge piece or support 79 rests on the templet 64. Member 79 may be a rod bent into U-shape having threaded ends by which the same is secured in adjusted position in an arm 80 of a lever pivoted at 81 to the forward end of rocking table 73. Lever 80 has a rearwardly extending arm 82 below rod 81, upon which it is pivoted. This rearwardly extending arm 82 is provided with a roller 83, at its rear end, which rests upon a cam-shaped flange 84 of the driving pulley 85. Springs 86 extend in a vertical direction between the bed-plate 3 of the machine and the forward edge of rocking table 73, to always hold the bridge piece 79 down in contact with templet 64.

The operation of the machine will now be clear. The rocking table 73 carrying cutter 69 is supported by the pivot 74 and controlled in position by pivotal connection therewith of lever 80, 82, the forward end of which is supported on the templet and the rear edge by the engagement of roller 83 on cam flange 84 of the driving pulley. The vertical position of the cutter 69 is determined by the adjustment of bridge piece 79, resting on templet 64. When the driving pulley 85 is rotated, the rear end of lever 82 is continuously raised and permitted to fall each rotation of the driving pulley, and since bridge piece 79 secured to the forward end of the lever remains in contact with the templet, the forward end of rocking table 73 rises and falls periodically in a limited movement, in proportion to the rise and fall of roller 83. The lever 80, 82 is in effect pivoted on the surface of the templet and rocks about the same. Cutter 69 rises and falls with the forward edge of table 73. The templet being adjusted in the templet-holder and the blank 24 in the work-holder, the operator reciprocates slide 1 by means of hand-lever 6, handle 57 being grasped in his other hand. (Obviously a power drive for slide 1 could be substituted for hand-lever 6). As blank 24 moves forward and back under the rotating cutter, the latter forms a series of gouges in its upper surface because of the up and down motion imparted to the cutter.

During the travel of slide 1, the operator continually oscillates handle 57 about its vertical pivot 58, which results in the blank and the templet continually changing their angular position with respect to the axis of the cutter. This results in the formation of the gouges 86 on the blank 24, as shown in Fig. 8, these gouges being directed sometimes at one angle and sometimes at another and hence presenting a very irregular appearance. The operator also controls the angular position of rocking support 11, and hence of the blank and the templet, with respect to a horizontal axis, by means of handle 57, which may be depressed at one side or the other of its horizontal center line, to cause the blank to be rocked about its horizontal axis and hence to cause either the central portion or the curved edge portions of the blank to be presented to the cutter. The depth of cut is controlled by the engagement of bridge piece 79 with templet 64, and templet 64 being of the same shape as the blank, the depth of cut given the blank will be uniform over its entire surface. This is, of course, because the table 73 and the cutter are raised when a higher portion of the templet is underneath bridge piece 79 and the table and cutter are lowered when a lower surface of the templet is under bridge piece 79. While lever 80, 82 may be considered as pivoted at its forward end in respect to the regular up and down movement imparted to it by cam 84, it may also be considered as pivoted at its rear end with respect to the movement imparted to its forward end because of the variation in surface of the templet, as the latter reciprocates under the bridge piece 79. Accordingly, the blank will be cut to a uniform depth regardless of its contour, and the same along its curved edges as upon its central portion.

It is obvious that various changes may be made from the details of construction described, without departing from the spirit of invention, the scope of which is indicated by the appended claims. I prefer to control the angular positions of the blank and templet by hand, as described, but it is obvious that my invention is not limited to such a manual control.

Having now particularly described my invention, what I claim and desire to protect by Letters Patent is as follows:—

1. In apparatus of the character described, the combination of a slide mounted for reciprocation, a work-holder thereon having means for clamping a blank, a rotating cutter, positioned in the path of the blank, means for imparting up and down movement to the cutter, and means for oscillating the work-holder about a vertical axis and also about a horizontal axis, at will, during the travel of said slide, substantially as set forth.

2. In apparatus of the character described, the combination of a slide mounted for reciprocation, a work-holder, and a templet-holder thereon having means for holding a blank and a templet, respectively, a rotating cutter, positioned in the path of the blank, means for tilting said work-holder and templet-holder together about a horizontal axis, means for supporting said cutter in positions having a constant relation at each instant, to the portion of the surface of the templet in said templet-holder, corresponding to the portion of the blank which said cutter is adapted to engage, and means for imparting rapid down and up movements to said cutter, from such positions, substantially as set forth.

3. In apparatus of the character described, the combination of a slide mounted for reciprocation, a pivoted support thereon, adapted to be rocked about an axis parallel to the travel of said slide, a work-holder on said support, having means for clamping a blank, means for rocking said work-holder about a vertical axis, a rotating cutter, positioned in the path of the blank, and means for imparting up and down motion to the cutter, substantially as set forth.

4. In apparatus of the character described, the combination of a slide mounted for reciprocation, a pivoted support thereon, adapted to be rocked about an axis parallel to the travel of said slide, a work-holder and a templet-holder on said support, adapted to hold a blank and a templet, respectively, a pivoted table, a bearing-member riding on the templet in said templet-holder, and connected to said table to support the free end thereof in relation to the engaged surface of said templet, a rotary cutter carried by said table, in the path of the blank, and means for imparting up and down motion to said cutter, substantially as set forth.

5. In apparatus of the character described, the combination of a slide mounted for reciprocation, a pivoted support thereon, adapted to be rocked about an axis parallel to the travel of said slide, a work-holder and a templet-holder on said support, adapted to hold a blank and a templet, respectively, means for rocking said work-holder and templet-holder together, about vertical axes, a pivoted table, a bearing-member riding on the templet in said templet-holder, and connected to said table to support the free end thereof in relation to the engaged surface of said templet, a rotary cutter carried by said table, in the path of the blank, and means for imparting up and down motion to said cutter, substantially as set forth.

6. In apparatus of the character described, the combination of a slide mounted for reciprocation, a pivoted support thereon, adapted to be rocked about an axis parallel to the travel of said slide, a work-holder and a templet-holder pivoted on vertical pivots on said support, adapted to hold a blank and a templet, respectively, a rotary cutter, adapted to operate upon said blank, means for positioning said cutter in relation to the upper surface of a templet on said templet-holder, and means for rocking said support, about its axis, and for rocking said work-holder and templet-holder together, about their axes, substantially as set forth.

7. In apparatus of the character described, the combination of a slide mounted for reciprocation, a pivoted support thereon, adapted to be rocked about an axis parallel to the travel of said slide, a work-holder upon said support, pivoted upon an axis normal to the travel of said slide, having means for clamping a blank, a rotatable cutter, mounted in the path of the blank, a handle, pivoted to said support, and adapted to rock the same, and a connection between said handle and said work-holder, whereby motion of said handle about its pivot rocks said work-holder about its pivot, substantially as set forth.

8. In apparatus of the character described, the combination of a slide mounted for reciprocation, a pivoted support thereon, adapted to be rocked about an axis parallel to the travel of said slide, a work-holder and a templet-holder, both pivoted on said support on axes normal to the travel of said slide, a rotatable cutter, positioned in relation to a templet in said templet-holder, in the path of a blank in the blank-holder, means for imparting reciprocating motion to said cutter, normal to the travel of said slide, a handle, pivoted to said support, and adapted to rock the same, and link connections between said handle and work-holder and templet-holder, whereby movement of said handle about its pivot oscillates said work-holder and templet-holder about their pivots, substantially as set forth.

9. In apparatus of the character described, the combination of a slide mounted for reciprocation, a work-holder and a templet-holder thereon, a cutter support pivoted at its rear end, a rotary cutter mounted in said support to extend from the forward edge thereof across the path of a blank in said work-holder, a lever pivotally connected, intermediate its ends, to the forward portion of said cutter-support, a bearing member at the forward end of said lever resting on a templet in said templet-holder, and means for periodically raising and lowering the rear end of said lever, substantially at set forth.

10. In apparatus of the character described, the combination of a slide mounted for reciprocation, a work-holder and a templet-holder thereon, a cutter support pivoted at its rear end, a rotary cutter mounted in said support to extend from the forward edge thereof across the path of a blank in said work-holder, a lever pivotally connected, intermediate its ends, to the forward portion of said cutter-support, rotary means for supporting the rear end of said lever in such a manner as to continuously and uniformly raise and lower the same, a bearing member at the forward end of said lever resting on a templet in said templet-holder, and spring means tending to keep said bearing member from rising out of contact with the templet, substantially as set forth.

11. In apparatus of the character described, the combination of a slide mounted for horizontal reciprocation, having vertical standards therein, in alinement, a rocking support having yokes mounted on pivots in said standards, said support being adapted to rock about an axis, comprising said pivots, parallel to the path of travel of said slide, a work-holder on said support, adjustable stops for limiting the oscillation of said support, and a handle for controlling at will the angular position of said support during the reciprocation of said slide, substantially as set forth.

12. In apparatus of the character described, the combination of a slide mounted for horizontal reciprocation, having vertical standards thereon, in alinement, a rocking support having yokes mounted on pivots in said standards, said support being adapted to rock about an axis, comprising said pivots, parallel to the path of travel of said slide, a work-holder and a templet-holder pivotally mounted on said support, on vertical pins, means for oscillating said work-holder and templet-holder together, means for controlling the angular position of said support, and adjustable stops for limiting the oscillation of said support, substantially as set forth.

13. In apparatus of the character described, the combination of a work-holder, a rotary cutter, means for causing reciprocating travel of one of the same past the other, means for imparting rapid motion of one of the same toward and from the other, during such travel, to cause the cutter to form a series of gouges in a blank in the work-holder, and means for varying the angular relation between the axes of the cutter and the blank during such travel, substantially as set forth.

14. In apparatus of the character described, the combination of a work-holder, a rotary cutter, means for causing reciprocating travel of one of the same past the other, means for imparting rapid motion of one of the same toward and from the other, during such travel, to cause the cutter to form a series of gouges in a blank in the work-holder, and means for varying the angular relation between the axes of the cutter and the blank during such travel, and also for varying, at will, during such travel, the angular position of the blank with respect to its own axis, substantially as set forth.

15. In apparatus of the character described, the combination of a work-holder, a rotary cutter, means for causing reciprocating travel of one of the same past the other, means for imparting rapid motion of one of the same toward and from the other, during such travel, to cause the cutter to form a series of gouges in a blank in the work-holder, means for presenting to the cutter portions of the surface of the blank having different heights, or curvatures, at will, during such travel, and means tending to cause the depth of cut of the cutter to remain constant, regardless of the configuration of the surface of the blank presented to the cutter, substantially as set forth.

16. In apparatus of the character described, the combination of a work-holder, a rotary cutter, means for causing reciprocating travel of one of the same past the other, means for imparting rapid motion of one of the same toward and from the other, during such travel, to cause the cutter to form a series of gouges in a blank in the work-holder, means for presenting to the cutter portions of the surface of the blank having different heights, or curvatures, at will, during such travel, means tending to cause the depth of cut of the cutter to remain constant, regardless of the configuration of the surface of the blank presented to the cutter, and means for varying the angular relation between the axes of the cutter and the blank during such travel, substantially as set forth.

17. In apparatus of the character described, a work-holder comprising a support, spring-pressed gripping fingers, adapted to engage one side of the work upon said support, gripping fingers positioned to engage the opposite side of the work, an abutment, positioned to engage one end of the work, a spring-pressed gripper adapted to engage the opposite end of the work, a lever pivotally connected to said spring-pressed gripping fingers, and adapted to move the same out of engagement with the work, a wedge member, pivotally connected to said lever and adapted to engage said spring-pressed gripper, to move the latter out of engagement with the work when the said spring-pressed gripping fingers are moved out of engagement with the work, and a guiding abutment adapted to coact with said wedge member, substantially as set forth.

18. In apparatus of the character described, a work-holder comprising a support, spring-pressed gripping fingers adapted to engage one side of the work upon said support, and an adjustable gripper positioned to engage the opposite side of the work, comprising a flanged plate, adapted to be secured adjacent to said support, in a plurality of positions, a second plate, a removable clamping finger, and means for securing said clamping finger between said second plate and a flange of said first plate, substantially as set forth.

This specification signed and witnessed this 7 day of September, 1915.

ADOLPH W. CHRISTIANSON.

Witnesses:
JOHN F. THOMPSON,
W. S. BROWN.

Copies of this patent may be obtained for five cents each, by addressing the "Commissioner of Patents Washington, D. C."